(12) United States Patent
Skelton

(10) Patent No.: US 8,348,441 B1
(45) Date of Patent: Jan. 8, 2013

(54) MULTI-LAYERED INTEGRALLY FORMED MIRRORED OBJECT AND THE METHODS OF MAKING THE SAME

(76) Inventor: Joseph P. Skelton, Fond du Lac, WI (US)

(*) Notice: Subject to any disclaimer, the term of this patent is extended or adjusted under 35 U.S.C. 154(b) by 376 days.

(21) Appl. No.: 12/885,056

(22) Filed: Sep. 17, 2010

Related U.S. Application Data

(60) Provisional application No. 61/243,202, filed on Sep. 17, 2009.

(51) Int. Cl.
*G02B 5/08* (2006.01)
(52) U.S. Cl. .................................................. 359/838
(58) Field of Classification Search .................. 359/838, 359/850, 855, 871
See application file for complete search history.

(56) References Cited

U.S. PATENT DOCUMENTS 7,054,668 B2 * 5/2006 Endo et al. ................. 455/566
2002/0141085 A1 * 10/2002 Whitehead et al. ........... 359/841

* cited by examiner

*Primary Examiner* — Euncha Cherry
(74) *Attorney, Agent, or Firm* — Brannen Law Office, LLC

(57) ABSTRACT

The present invention relates to a multi-layered integrally formed mirrored object, and the methods of making the same. In one embodiment, the invention can be formed from a single piece of material that is placed into a mold. The object can be expanded under pressure until it is pressed against the mold. The present invention can have multiple surfaces, which may or may not be parallel to each other. The surfaces can be continuously formed with the adjacent surfaces. One suitable material is stainless steel, which can be highly polished.

20 Claims, 2 Drawing Sheets

MULTI-LAYERED INTEGRALLY FORMED MIRRORED OBJECT AND THE METHODS OF MAKING THE SAME

PRIORITY CLAIM

This United States utility patent application claims priority on and the benefit of provisional application 61/243,202 filed Sep. 17, 2009, the entire contents of which are hereby incorporated herein by reference.

BACKGROUND OF THE INVENTION

1. Field of the Invention.

The present invention relates to a multi-layered integrally formed mirrored object and the methods of making the same.

2. Description of the Related Art.

Mirrors come in many sizes and shapes. A traditional mirror typically has a single flat surface. The most basic example is an object having a reflective surface. It is common for minors to be comprised of large flat surfaces. Some examples include polished metals. The metals may be in a foil form, and covered with glass for rigidity and protection.

It is possible to physically stack layers of mirror to achieve a three dimensional minor. Yet, there are drawbacks with such an approach. Namely:

A stacked mirror will have gaps between the layers. The gaps can be unsightly.

Such a problem is exacerbated in stacked mirrors that are covered in glass, as the distance between the reflective layers is dramatic.

A stacked mirror will be comprised of several layers that require an adhesive or other means of attachment. The bond between the layers can become weak over time.

Thus there exists a need for a multi-layered integrally formed mirrored object, and the methods of making the same that solves these and other problems.

SUMMARY OF THE INVENTION

The present invention relates to a multi-layered integrally formed mirrored object and the methods of making the same. In one embodiment, the invention can be formed from a single piece of material that is placed into a mold. The object can be expanded under pressure until it is pressed against the mold. The present invention can have multiple surfaces, which may or may not be parallel to each other. The surfaces can be continuously formed with the adjacent surfaces. One suitable material is stainless steel, which can be highly polished.

According to one advantage of the present invention, the object is formed with a continuous surface. This advantageously eliminates unsightly gaps on the front of the mirror.

According to another advantage of the present invention, the unitary piece is multi-faceted without the need for adhesives or other connections. Hence, there is no possibility of the object falling apart over time.

Other advantages, benefits, and features of the present invention will become apparent to those skilled in the art upon reading the detailed description of the invention and studying the drawings.

DETAILED DESCRIPTION OF THE PREFERRED EMBODIMENTS

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
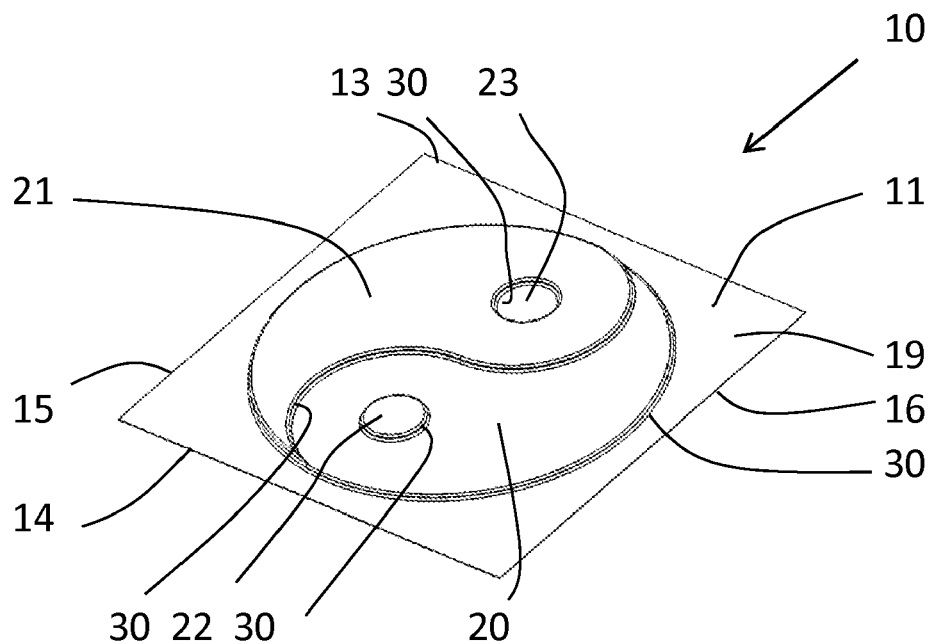
FIG. 1 is a perspective view of an embodiment of a mirror of the present invention.
Figure 2:
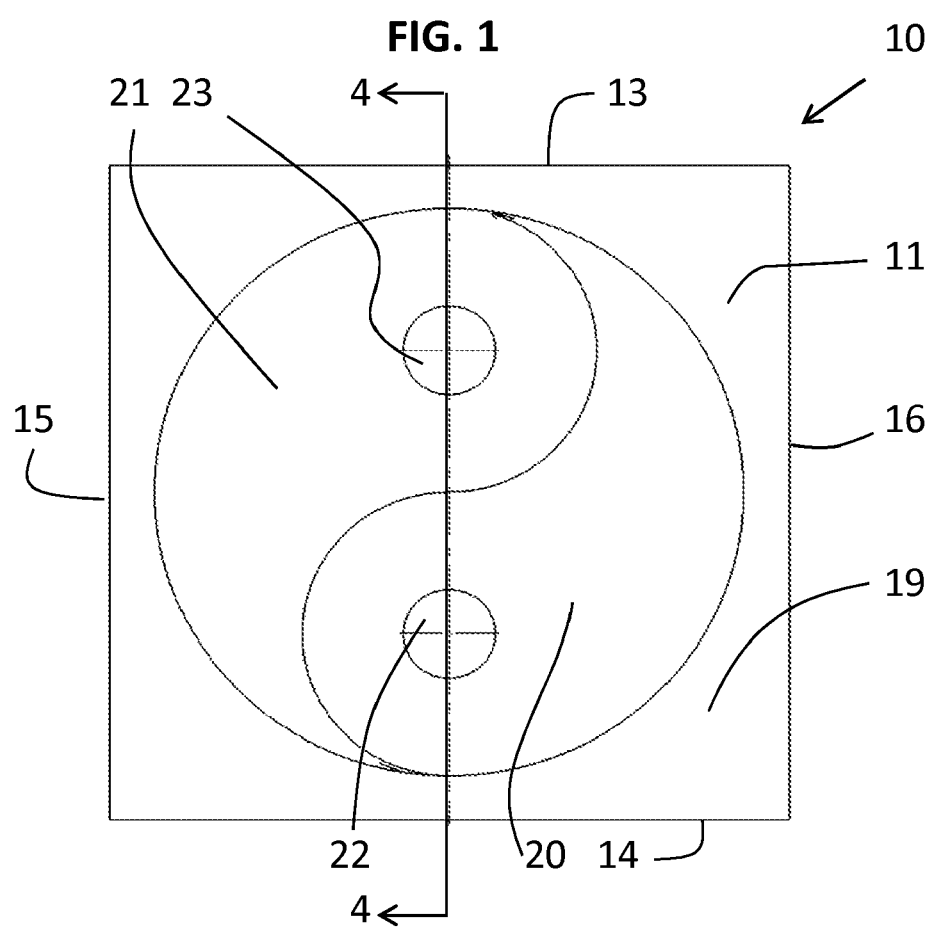
FIG. 2 is front view of the preferred embodiment shown in FIG. 1.
Figure 3:
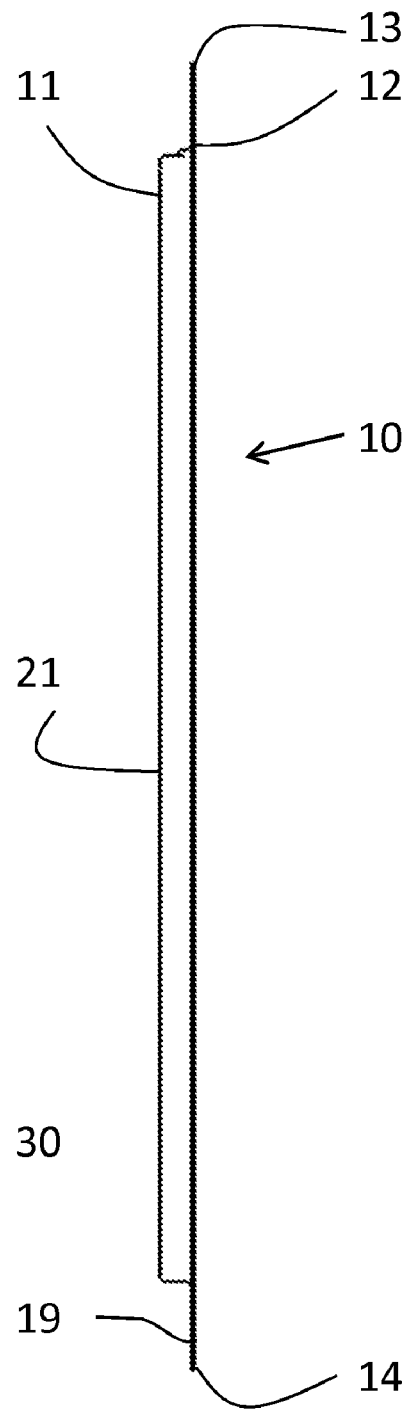
FIG. 3 is a side view of the preferred embodiment shown in FIG. 1.
Figure 4:
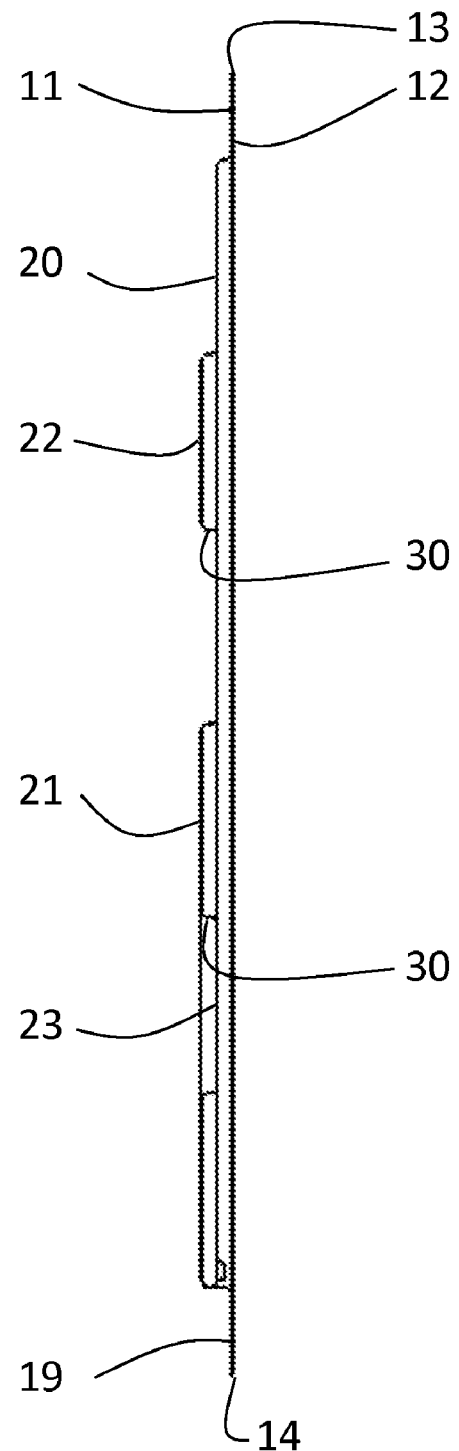
FIG. 4 is a cross sectional view taken along line 4-4 in FIG. 2.

Turning now to FIGS. 1-4, it is seen that a preferred embodiment of a mirror 10 is illustrated. One preferred material is stainless steel. However, it is understood that other materials may be utilized without departing from the broad aspects of the present invention. In the preferred embodiment, 20 ga stainless steel is used. However, other thicknesses, such as between 16 ga and 30 ga may be used without departing from the broad aspects of the present invention. Other materials known to achieve satisfactory results are copper, aluminum and carbon steel. It is understood that greater pressures will be required for forming minors out of thicker materials. It has been observed that pressures from 50 to 5000 PSI have been most effective at forming mirrors 10 of various materials.

The minor 10 has a front 11, a rear 12, a top 13, a bottom 14 and opposed sides 15 and 16. While the mirror is shown to be generally square shaped, it is appreciated that the mirror may alternatively be other shapes without departing from the broad aspects of the present invention.

The front 11 of the mirror is comprised of several layers or surfaces 20, 21, 22 and 23, respectively that extend outward from a base 19. The surfaces are shown to be planar, and are shown to be generally parallel to each other. Yet, it is appreciated that the surfaces could be non-parallel without departing from the broad aspects of the present invention. The front 11 is preferably continuously formed, having sidewalls 30 between the respective surfaces.

In the illustrated embodiment, surfaces 20-23 form a yin-yang design. Surface 20 is projected away from base 19 a first amount. Surface 21 is projected away from surface 20 by approximately the same amount as surface 20 is projected away from base 19. A protruded surface 22 is generally planar and parallel to the plane of surface 21 extends from surface 20. A depression is formed recessed from surface 21. The depression has a surface 23 that is planar and preferably parallel to the plane of surface 20. The difference between the heights of the surfaces 20-23 is accommodated by the incorporation of a sidewall 30 to achieve a continuous surface.

The minor 10 is preferably made in a balloon process, wherein the balloon is expanded under pressure within a mold. The mold is created having protrusions (depressions in the finished product) and depressions (protrusions in the finished product). Lettering and numbers can be added in addition to unlimited numbers of designs, even though not shown in the illustrated embodiment. A metal balloon can be formed from two sheets of material that are welded or otherwise bonded around their perimeter.

As an alternative to a balloon forming process, a large press may be used without departing from the broad aspects of the present invention, wherein the press would have a seal around one side to allow pressure to form the mirror.

The minor 10 preferably can extend a few inches between the base 19 and the outermost surface. It is understood that the distance is limited by the material qualities, and can extend beyond a few inches in depth if there is sufficient material thickness of the stock material.

Thus it is apparent that there has been provided, in accordance with the invention, a multi-layered integrally formed mirrored object, and the methods of making the same that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An apparatus comprising:
a front;
a rear;
a top;
a bottom;
a first side; and
a second side,
wherein said front comprises a unitary piece of material defining a first layer and a second layer, said first layer and said second layer being reflective and said first layer being offset from said second layer.

2. The apparatus of claim 1 wherein said first layer is parallel to said second layer.

3. The apparatus of claim 1 wherein said front is multi-faceted.

4. The apparatus of claim 1 wherein said front further comprises a continuous side wall between said first layer and said second layer.

5. The apparatus of claim 1 wherein said front is comprised of stainless steel.

6. The apparatus of claim 5 wherein said stainless steel is between 16 ga and 30 ga.

7. The apparatus of claim 6 wherein said stainless steel is 20 ga.

8. The apparatus of claim 1 wherein said apparatus is comprised of one of:
stainless steel;
copper;
aluminum; and
carbon steel.

9. The apparatus of claim 1 wherein said front is welded to said rear at said top, said bottom, said first side and said second side to define an interior region between said front and said back, said front then being mechanically expanded away from said rear a selected distance to form said first layer and said second layer.

10. The apparatus of claim 9 wherein said selected distance is up to approximately two inches.

11. The apparatus of claim 1 wherein said apparatus consists of a single continuous and unitary piece of material.

12. An apparatus comprising:
a front;
a rear;
a top;
a bottom;
a first side; and
a second side,
wherein said front is welded to said rear at said top, said bottom, said first side and said second side to define an interior region between said front and said back, said front then being mechanically expanded away from said rear a selected distance to form said first layer and said second layer, said first layer and said second layer being reflective and said first layer being offset from said second layer.

13. The apparatus of claim 12 wherein said first layer is parallel to said second layer.

14. The apparatus of claim 13 wherein said selected distance is up to approximately two inches.

15. The apparatus of claim 13 wherein said apparatus consists of a single continuous and unitary piece of material.

16. The apparatus of claim 12 wherein said front is comprised of stainless steel having a thickness of between 16 ga and 30 ga.

17. The apparatus of claim 16 wherein said thickness is approximately 20 ga.

18. A method of forming a multi-layered mirrored object comprising the steps of:
providing a first sheet of material having a first sheet of material perimeter;
providing a second sheet of material having a second sheet of material perimeter;
bonding the first sheet to the second sheet along a majority of the first sheet of material perimeter and second sheet of material perimeter leaving a single area that is not bonded;
providing a mold;
providing a pressure source;
placing the first sheet and second sheet in the mold; and
applying pressure from the pressure source through the single area that is not bonded to force the first sheet and second sheet for conform to the shape of the mold, wherein the first sheet has a first layer and a second layer that are continuously formed selected respective distances from the second sheet.

19. The method of claim 18 wherein the steps of providing the first sheet of material and the second sheet of material consists of providing stainless steel having a thickness of between 16 ga and 30 ga.

20. The method of claim 18 wherein the step of applying pressure from the pressure source comprises applying pressure in the range of between 5 and 5000 psi.

* * * * *